United States Patent
Esmailzadeh et al.

(10) Patent No.: US 7,421,283 B2
(45) Date of Patent: *Sep. 2, 2008

(54) TRANSMISSION POWER CONTROL METHOD AND APPARATUS FOR MOBILE COMMUNICATION SYSTEM

(75) Inventors: Riaz Esmailzadeh, Yokosuka Kanagawa (JP); Takashi Yano, Tokorozwa (JP); Nobukazu Doi, Hachioji (JP)

(73) Assignee: Hitachi Communication Technologies, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/544,655

(22) Filed: Oct. 10, 2006

(65) Prior Publication Data

US 2007/0032197 A1 Feb. 8, 2007

Related U.S. Application Data

(63) Continuation of application No. 10/376,310, filed on Mar. 3, 2003, now Pat. No. 7,120,457, which is a continuation of application No. 09/729,272, filed on Dec. 5, 2000, now Pat. No. 6,546,260, which is a continuation of application No. 08/975,672, filed on Nov. 28, 1997, now Pat. No. 6,175,744.

(30) Foreign Application Priority Data

Nov. 27, 1996 (JP) .................... 8/316232

(51) Int. Cl.
*H04B 7/00* (2006.01)
*H04B 17/00* (2006.01)
(52) U.S. Cl. .................. 455/522; 455/67.11; 455/127.1

(58) Field of Classification Search ................. 455/522, 455/127.1, 67.11, 517, 68, 572, 574, 13.4, 455/63.1, 67.13, 114.2, 115.1; 370/317, 370/318, 332

See application file for complete search history.

(56) References Cited

U.S. PATENT DOCUMENTS 4,811,421 A 3/1989 Havel (Continued)

FOREIGN PATENT DOCUMENTS

EP 0 548 939 A2 6/1993

(Continued)

OTHER PUBLICATIONS

Korean Patent Office Action with issue date of Mar. 26, 2004.

(Continued)

*Primary Examiner*—Sonny Trinh
(74) *Attorney, Agent, or Firm*—Antonelli, Terry, Stout & Kraus, LLP.

(57) ABSTRACT

A method and apparatus for controlling the power of a signal transmitted between a base station and a mobile terminal which constitute a mobile communication system. At least one of the base station and the mobile terminal has functions to compare a predetermined reference value and a necessary transmission power obtained as a result of transmission power control in order to compensate for a signal intensity fluctuation occurring on a link between the base station and the mobile terminal, temporarily stopping the transmission if the necessary transmission power is larger than a predetermined permissible value, and transmit the signal if the necessary transmission power is equal to or smaller than the predetermined permissible value.

4 Claims, 9 Drawing Sheets

U.S. PATENT DOCUMENTS

| | | | |
|---|---|---|---|
| 5,093,924 A | 3/1992 | Toshiyuki et al. | 455/450 |
| 5,267,262 A | 11/1993 | Wheatley, III | |
| 5,282,239 A | 1/1994 | Yokoi et al. | |
| 5,333,175 A | 7/1994 | Ariyavisitakul et al. | |
| 5,485,486 A | 1/1996 | Gilhouesen et al. | |
| 5,535,429 A | 7/1996 | Bergenlid et al. | |
| 5,539,728 A | 7/1996 | Gaiani et al. | |
| 5,559,789 A | 9/1996 | Nakano et al. | |
| 5,559,790 A | 9/1996 | Yano et al. | |
| 5,574,984 A | 11/1996 | Reed et al. | |
| 5,590,409 A | 12/1996 | Sawahashi et al. | |
| 5,604,730 A | 2/1997 | Tiedemann, Jr. | |
| 5,655,219 A | 8/1997 | Jusa et al. | 455/338 |
| 5,673,259 A | 9/1997 | Quick, Jr. | 370/342 |
| 5,713,074 A | 1/1998 | Hubert | |
| 5,839,056 A | 11/1998 | Hakkinen | |
| 5,845,212 A | 12/1998 | Tanaka | |
| 5,864,760 A | 1/1999 | Gilhousen et al. | |
| 5,870,393 A | 2/1999 | Yano et al. | |
| 5,873,027 A | 2/1999 | Asano | |
| 5,987,033 A | 11/1999 | Boer et al. | 370/445 |
| 6,031,828 A | 2/2000 | Koro et al. | |
| 6,052,377 A * | 4/2000 | Ohmi et al. | 370/437 |
| 6,175,744 B1 | 1/2001 | Esmailzadeh et al. | |
| 6,269,088 B1 | 7/2001 | Masui | |
| 6,330,456 B1 | 12/2001 | Hashem et al. | 455/522 |
| 6,351,651 B1 * | 2/2002 | Hamabe et al. | 455/522 |
| 6,377,813 B1 | 4/2002 | Kansakoski et al. | 455/522 |
| 6,526,032 B1 | 2/2003 | Kitade et al. | 370/337 |
| 6,614,770 B1 * | 9/2003 | Kayama et al. | 370/331 |
| 6,873,645 B2 * | 3/2005 | Lomp et al. | 375/142 |
| 6,880,103 B2 * | 4/2005 | Kim et al. | 714/18 |
| 7,069,033 B1 * | 6/2006 | Moon et al. | 455/522 |
| 7,330,446 B2 * | 2/2008 | Lee et al. | 370/318 |

FOREIGN PATENT DOCUMENTS

| | | |
|---|---|---|
| EP | 0682419 A | 11/1995 |
| JP | 56-117441 | 9/1981 |
| JP | 60-182228 | 9/1985 |
| JP | 63-184420 | 7/1988 |
| JP | 64-042944 | 2/1989 |
| JP | 01-174023 | 7/1989 |
| JP | 02-184149 | 7/1990 |
| JP | 05-030001 | 2/1993 |
| JP | 07-212303 | 8/1995 |
| JP | 07-221700 | 8/1995 |
| JP | 08-065201 | 3/1996 |
| JP | 08070062 A | 3/1996 |
| JP | 08-242198 | 9/1996 |
| JP | 09-331291 | 12/1997 |
| JP | 410215219 A | 8/1998 |
| KR | 10-1997-0055914 | 7/1997 |

OTHER PUBLICATIONS

Japanese Patent Office Action, JP-9-325096 mailed Jun. 8, 2004.
Japanese Patent Office Action, JP-2002-068405 mailed Jun. 8, 2004.

* cited by examiner

TRANSMISSION POWER CONTROL METHOD AND APPARATUS FOR MOBILE COMMUNICATION SYSTEM

This is a continuation of application Ser. No. 10/376,310, filed Mar. 3, 2003 (now U.S. Pat. No. 7,120,457), which, in turn, is a continuation of U.S. application Ser. No. 09/729,272, filed Dec. 5, 2000 (now U.S. Pat. No. 6,546,260), and which, in turn, is a continuation of Ser. No. 08/975,672, filed Nov. 28, 1997 (now U.S. Pat. No. 6,175,744); and the entire disclosures of which are hereby incorporated by reference.

BACKGROUND OF THE INVENTION

The present invention generally relates to a transmission power control method and apparatus for mobile communication system which controls the transmission power between the base station and mobile terminal of a mobile communication system, and particularly to the effective technology suitable for use in the transmission power control method and apparatus for mobile communication system which controls the transmission power in accordance with the change of signals received between the base station and mobile terminal of the mobile communication system of TDD-SS (Time Division Duplex-Spread Spectrum) and FDD (Frequency Division Duplex) system.

There is a conventional mobile communication system for transmitting and receiving data by radio between base stations and mobile terminals. This mobile communication system employs different carrier frequencies for the up link on which signals are transmitted from a mobile terminal to the base station and for the down link on which signals are transmitted from the base station to the mobile terminal by the FDD.

The signal transmitted and received between the base station and mobile terminal of this mobile communication system is attenuated along the distance between the base station and mobile terminal, and by obstacles present therebetween, and fluctuated by the fading due to the interference between the direct wave and the reflected wave, or the like.

In order to compensate the fluctuation due to the fading in the signal transmitted and received between the base station and the mobile terminal is dependent upon the carrier frequency, the transmission power in the FDD mobile communication system is controlled by closed-loop control. For example, the IS-95 specifications apply up link transmission power control of the FDD system which controls the transmission power of the terminal. The technique on the scheme of the FDD down link power control is proposed in U.S. Pat. No. 5,559,790 entitled "Spread Spectrum Communication System and Transmission Power Control Method Therefor" invented by Yano, et al., assigned to the present assignee and issued Sep. 24, 1996. In addition, another technique on the information of the up link power control is proposed in a copending U.S. patent application Ser. No. 08/690,819 entitled "CDMA Mobile Communication System and Communication Method" by those inventors, assigned to the present assignee and filed on Aug. 1, 1996. The disclosure of the above U.S. Application, and the continuation application, Ser. No. 08/678,656 of the above U.S. Patent, filed on Jul. 11, 1996, are incorporated in the disclosure of this application by reference.

Whether the mobile communication system is of DMA-FDD or CDMA-TDD, the following problem is caused hen transmission power control is performed through the transmission path between the mobile terminal and the base station. In other words, when the attenuation of data in the transmission path between the base station and a particular mobile terminal is temporarily increased, the base station transmits signals with an extremely higher power in accordance with the transmission power control, and thus interferes with other mobile terminals. In addition, when the transmission power from a mobile terminal, on the contrary, is excessively risen, it also obstructs or interferes with other base stations.

Moreover, in the FDD mobile communication system, since the closed loop control is still performed in which the transmission power on the up link is controlled by the mobile terminal in accordance with the up link power control information obtained at the base station, while that on the down link is controlled by the base station in accordance with the down link power control information attained at the mobile terminal, there is the problem that it takes a long time to control the transmission power.

SUMMARY OF THE INVENTION

Accordingly, it is an object of the invention to provide a transmission power control method and apparatus for the mobile communication system, by which the transmission power can be prevented from being wasted and from obstructing other stations.

It is another object of the invention to provide a transmission power control method and apparatus for the mobile communication system, which can fast compensate for the signal fluctuation occurring on the up link that is provided from the mobile terminal to the base station.

It is still another object of the invention to provide a transmission power control method and apparatus for the mobile communication system, which can fast compensate for the signal fluctuation caused on the down link that is provided from the base station to the mobile terminal.

According to the concept of the present invention, there is provided a transmission power control method and apparatus for controlling the power of a signal transmitted between a base station and a mobile terminal, which includes: means for detecting a signal fluctuation occurring on a down link or up link; means for generating power control information in order to compensate for the signal fluctuation occurring on the up link or down link on the basis of the detected signal fluctuation; means for compensating for the power of the signal transmitted on the up link or down link on the basis of the information; and means for comparing the generated power control information and a predetermined permissible compensated value, temporarily stopping the transmission if the power control information is larger than a predetermined permissible compensation value as a result of the comparison, and compensating for the transmission power if the power control information is equal to or smaller than the predetermined permissible compensation value, all the above means being provided in the base station or mobile terminal. The above idea is useful particularly when a signal of data packets is transmitted between the base station and the mobile terminal. In this idea, unlike the speech service, when the transmission power of the packet is requested to be more than a predetermined value, and when it will be too intense to interfere with other base stations or mobile terminals in a mobile communication system, the transmission is temporarily stopped, and a certain time later it resumes, in which case it has been confirmed by the inventors that the communications are not disturbed at all.

In order to achieve the above objects, the present invention proposes the following typical aspects.

(1) A transmission power control method for controlling the power of a signal transmitted between the base station and the mobile terminal which constitute a mobile communication system, comprises the steps of detecting a signal fluctuation occurring on a down link that is provided to transmit a signal from the base station to the mobile terminal, generating power control information for compensating for a signal fluctuation on an up link on the basis of the detected signal fluctuation, compensating for the transmission power of the signal transmitted on the up link from the mobile terminal to the base station on the basis of the generated power control information, and transmitting the power control information used for compensating for the transmission power, and transmitting the signal of which the power has been compensated, from the mobile terminal to the base station.

In the transmission power control method for the mobile communication system, the mobile terminal that communicates with the base station receives a signal transmitted on a down link from the base station to the mobile terminal, for example, a pilot signal transmitted on a pilot channel.

Then, the mobile terminal detects a signal fluctuation, such as the attenuation, occurring on the down link due to the fading and distance or an obstacle along the channel.

The mobile terminal assumes that the detected signal fluctuation in the down link similarly occurs in the up link on which a signal is transmitted from the mobile terminal to the base station, and generates power control information to compensate for the signal fluctuation occurring on the up link.

Then, the mobile terminal modifies the transmission power of the signal to be transmitted on the up link from the mobile terminal to the base station on the basis of the generated power control information.

In addition, the mobile terminal also transmits the power control information used for compensating for the transmission power from the mobile terminal to the base station.

Thus, according to the transmission power control method for the mobile communication system, since the mobile terminal compensates for the signal fluctuation occurring on the up link for the transmission from the mobile terminal to the base station by detecting the signal fluctuation occurring on the down link for the transmission from the base station to the mobile terminal, it is possible to fast compensate for the signal fluctuation occurring on the up link for the transmission from the mobile terminal to the base station.

(2) A transmission power control method for the mobile communication system, according to the aspect (1), wherein the base terminal that communicates with the mobile terminal has functions to receive the power control information transmitted from the mobile terminal to the base station, detect a signal fluctuation occurring on the up link for the transmission from the mobile terminal to the base station, generate power control information to compensate for the signal fluctuation occurring on the down link on the basis of the detected signal fluctuation and the power control information sent from the mobile terminal, and compensate for the transmission power of the signal to be transmitted on the down link from the base station to the mobile terminal on the basis of the generated power control information.

The base station receives a signal sent on the up link from the mobile terminal to the base station, for example, a signal of reservation packets and data packets transmitted on a reservation channel and transmission channel.

The base station detects the signal fluctuation occurring on the up link for the transmission from the mobile terminal to the base station, and generate power control information to compensate for the signal fluctuation occurring on the down link on the basis of the detected signal fluctuation and the power control information sent from the mobile terminal.

Then, the base station modifies the transmission power of the signal transmitted on the down link from the base station to the mobile terminal on the basis of the generated power control information.

Thus, according to the transmission power control method for the mobile communication system, since the base station detects the signal fluctuation occurring on the up link for the transmission from the mobile terminal to the base station, and compensates for the signal fluctuation occurring on the down link for the transmission from the base station to the mobile terminal, it is possible to fast compensate for the signal fluctuation occurring on the down link for the transmission from the base station to the mobile terminal.

(3) A transmission power control method for the mobile communication system, according to the aspect (1) or (2), further comprising the steps of comparing the generated power control information and a maximum permissible modification or compensation value, temporarily stopping the transmission if the generated power control information is larger than the maximum permissible compensation value, and compensating for the transmission power if the generated power control information is equal to or smaller than the maximum permissible compensation value.

More specifically, the base station or the mobile terminal compares the generated associated power control information and the maximum permissible compensation value of the base station or the mobile terminal, temporarily stops the transmission if the generated power control information is larger than the maximum permissible compensation value until the next time slot comes.

If the generated power control information is equal to or smaller than the maximum permissible compensation value, the transmission power is compensated on the basis of the generated power control information.

Thus, according to the transmission power control method for the mobile communication system, since the transmission is temporarily stopped if the generated control information is larger than the maximum permissible compensation value and resumes when the power control information becomes equal to or smaller than the maximum permissible compensation value, the transmission power can be prevented from being wasted.

Other objects, features and advantages of the invention will become apparent when reading the description of the following embodiments taken in conjunction with the accompanying drawings.

DESCRIPTION OF THE PREFERRED EMBODIMENTS

One embodiment of the transmission power control method and apparatus according to the invention will be described, which is used in the mobile communication system and which controls the transmission power when communication is made between a base station and a mobile terminal by means of the TDD-SS system.

Figure 1:
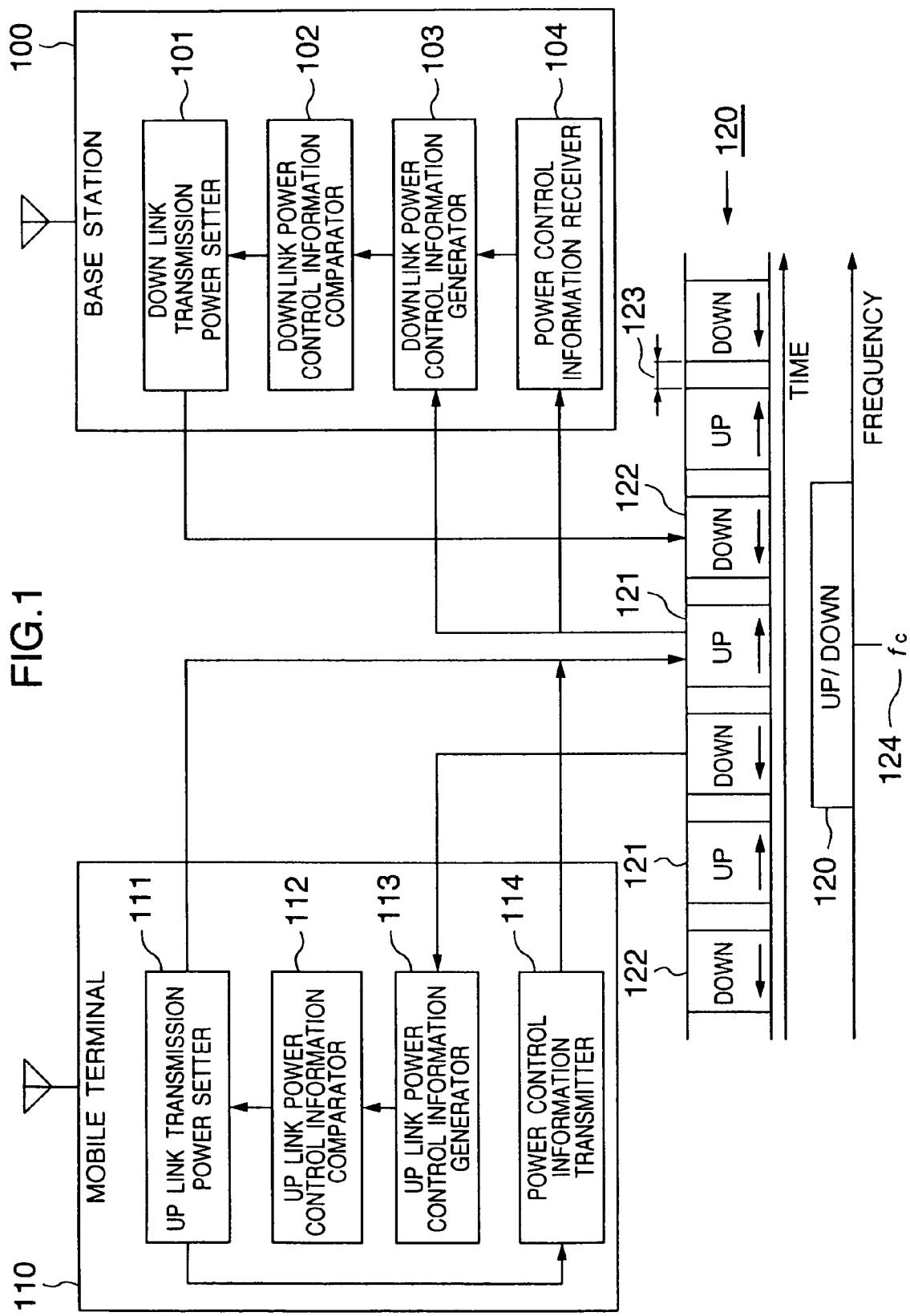
FIG. 1 is a block diagram of a mobile communication system according to one embodiment of the invention.

FIG. 1 is a block diagram showing an outline of the construction of the mobile communication system according to this embodiment. Referring to FIG. 1, the mobile communication system of this embodiment has the base station 100 which includes a down link transmission power setter 101, a down link power control information comparator 102, a down link power control information generator 103 and a power control information receiver 104, the mobile terminal 110 which includes an up link transmission power setter 111, an up link power control information comparator 112, an up link power control information generator 113 and a power control information transmitter 114, communication channels 120 which include an up link 121, a down link 122 and guard times 123, and a carrier frequency 124.

The base station 100 and the mobile terminal 110 are connected by the up link 121 on which a signal is transmitted from the mobile terminal 110 to the base station 100 and the down link 122 on which a signal is transmitted from the base station 100 to the mobile terminal 110. The communication channels 120 on the carrier frequency 124 are assigned in a time-sharing manner to the up link 121 and down link 122 between which the guard times 123 are provided to prevent the interference.

The down link transmission power setter 101 of the base station 100 responds to the result from the down link power control information comparator 102 to fix a transmission power that is to be transmitted on the down link 122 from the base station 100.

The down link power control information comparator 102 of the base station 100 compares whether or not the control information of down link 122 which is generated by the down link power control information generator 103 is larger than the maximum permissible compensation value of the base station 100.

The down link power control information generator 103 generates power control information for the down link 122 by using the signal information on the up link 121 and the power control information of the down link sent from the mobile terminal 110.

Since the signal received by the base station 100 on the up link 121 has been compensated by the mobile terminal 110, the down link power control information generator 103 of the base station 100 computes the value of the signal on the up link 121 before compensation by use of the power control information transmitted from the mobile terminal 110, and generates the power control information for the down link 122.

The power control information receiver 104 of the base station 100 receives the power control information transmitted from the mobile terminal 110.

The up link transmission power setter 111 of the mobile terminal 110 determines the transmission power which the mobile terminal 110 is to transmit on the up link 121 in accordance with the result from the up link power control information comparator 112.

The up link power control information comparator 112 of the mobile terminal 110 compares whether or not the control information of the up link 121 which is generated by the up link power control information generator 113 is larger than the maximum permissible compensation value of the mobile terminal 110.

The up link power control information generator 113 of the mobile terminal 110 generates the power control information of the up link 121 by use of the signal information on the down link 122.

The power control information transmitter 114 of the mobile terminal 110 transmits the power control information of the up link 121 set by the up link transmission power setter 111 to the base station 100.

Figure 2:
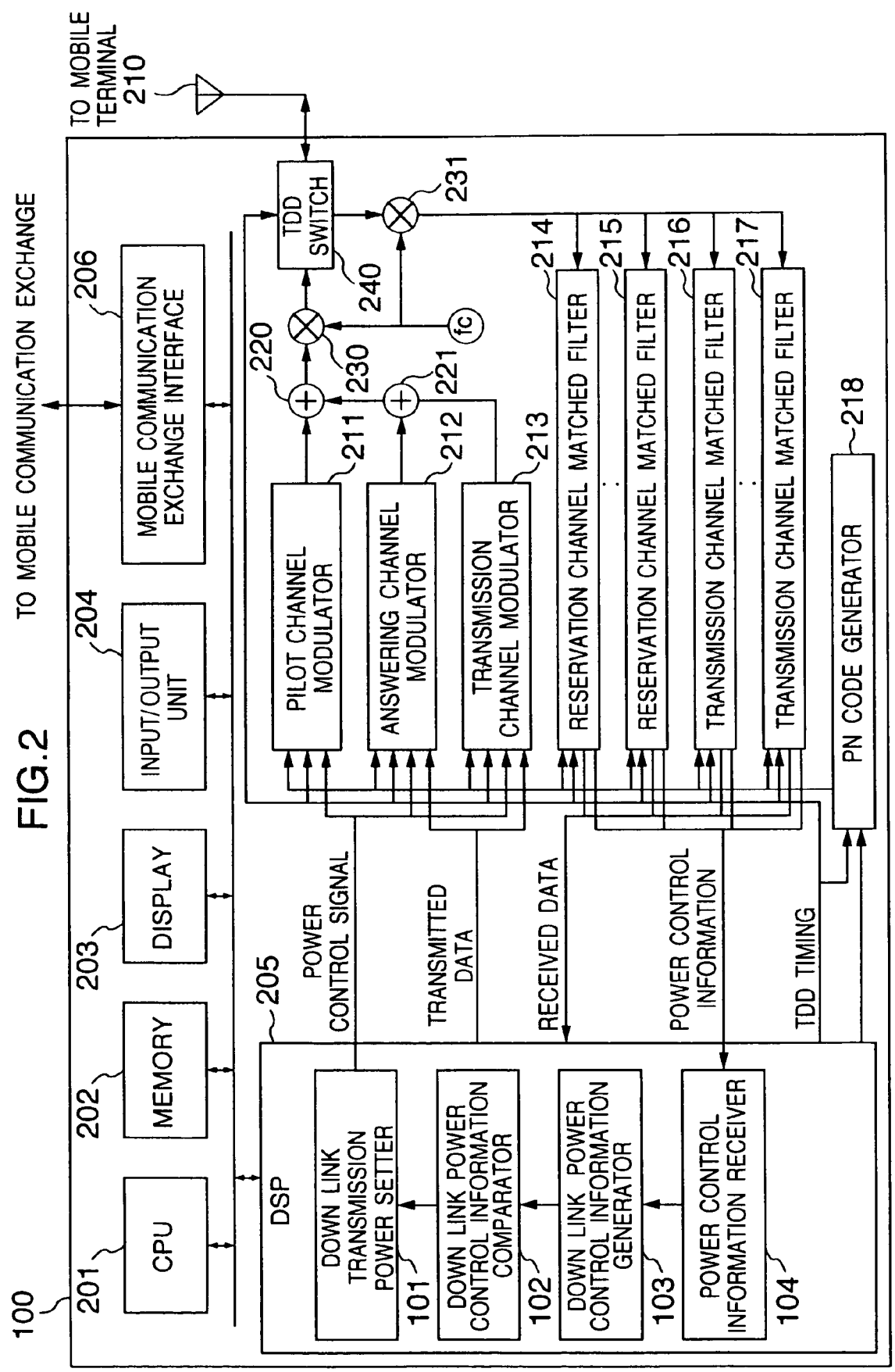
FIG. 2 is a block diagram of a base station 100 of the mobile communication system according to this embodiment.

FIG. 2 is a block diagram showing an outline of the construction of the base station 100 of the mobile communication system according to this embodiment. The base station 100 further includes a CPU 201, a memory 202, a display unit 203, an input/output unit 204, the digital signal processor (DSP) 205, a mobile communication exchange interface unit 206, an antenna 210, a pilot channel modulator 211, an answering channel modulator 212, a transmission channel modulator 213, reservation channel matched filters 214-215, transmission channel matched filters 216-217, a para-noise code generator (PN code generator) 218, adders 220 and 221, multipliers 230 and 231, and a TDD switch 240.

In the base station 100, a bus connects the CPU 201 that controls the operation of the whole base station 100, the memory 202 that loads a control program for controlling the operation of the whole base station 100, the display unit 203 that displays the operating condition of the base station 100, the input/output unit 204 that instructs the base station 100 to operate for the input/output process, the DSP 205 that controls the process for communicating with the mobile terminal 110, and the mobile communication exchange interface unit 206.

The base station 100 communicates with the mobile terminal 110 by means of TDD-SS. Between the base station 100 and the mobile terminal 110, there are provided a pilot channel, a reservation channel, an answering (responding) channel and a transmission channel on the same carrier frequency 124 (see FIG. 4).

The DSP 205 of the base station 100 includes the down link transmission power setter 101, the down link power control information comparator 102, the down link power control information generator 103 and the power control information receiver 104 as described above.

In addition, the DSP 205 is connected to the pilot channel modulator 211, the answering channel modulator 212, the transmission channel modulator 213, the reservation channel matched filters 214-215, the transmission channel matched filters 216-217, the PN code generator 218, and the TDD switch 240.

The pilot channel modulator 211 of the base station 100 modulates the pilot channel for the transmission of the pilot signal, and supplies the modulated pilot signal through the adder 220, multiplier 230 and TDD switch 240 to the antenna 210, from which it is transmitted to the mobile terminal 110.

The answering channel modulator 212 modulates the answering channel through which an answer or response to the reservation packet received from the mobile terminal 110 is transmitted. The modulated answer to the reservation packet is supplied through the adders 220 and 221, multiplier 230 and TDD switch 240 to the antenna 210, from which it is transmitted to the mobile terminal 110.

The transmission channel modulator 213 modulates a plurality of transmission channels on which data packets are transmitted. The modulated data packet is supplied through the adders 220 and 221, multiplier 230 and TDD switch 240 to the antenna 210, from which it is transmitted to the mobile terminal 110.

The reservation channel matched filters 214-215 receive the reservation packets transmitted from the mobile terminal 110, and the received reservation packets are processed by the DSP 205.

The transmission channel matched filters 216-217 receive the data packets sent from the mobile terminal 110, and the received data packets are processed by the DSP 205.

The PN code generator 218 generates the PN code that is used on each of the pilot channel, reservation channel, answering channel and transmission channel.

The TDD switch 240 responds to a TDD timing signal produced from the DSP 205 to timely switch the up link 121 and down link 122, or to timely change over from transmission to reception or vice versa. When the base station 100 receives the power control information from the mobile terminal 110, it supplies the received power control information through the reservation channel matched filters 214-215 and transmission channel matched filters 216-217 to the power control information receiver 104 of the DSP 205.

The power control signal fixed by the down link transmission power setter 101 of the DSP 205 is supplied to the pilot channel modulator 211, answering channel modulator 212 and transmission channel modulator 213

Figure 3:
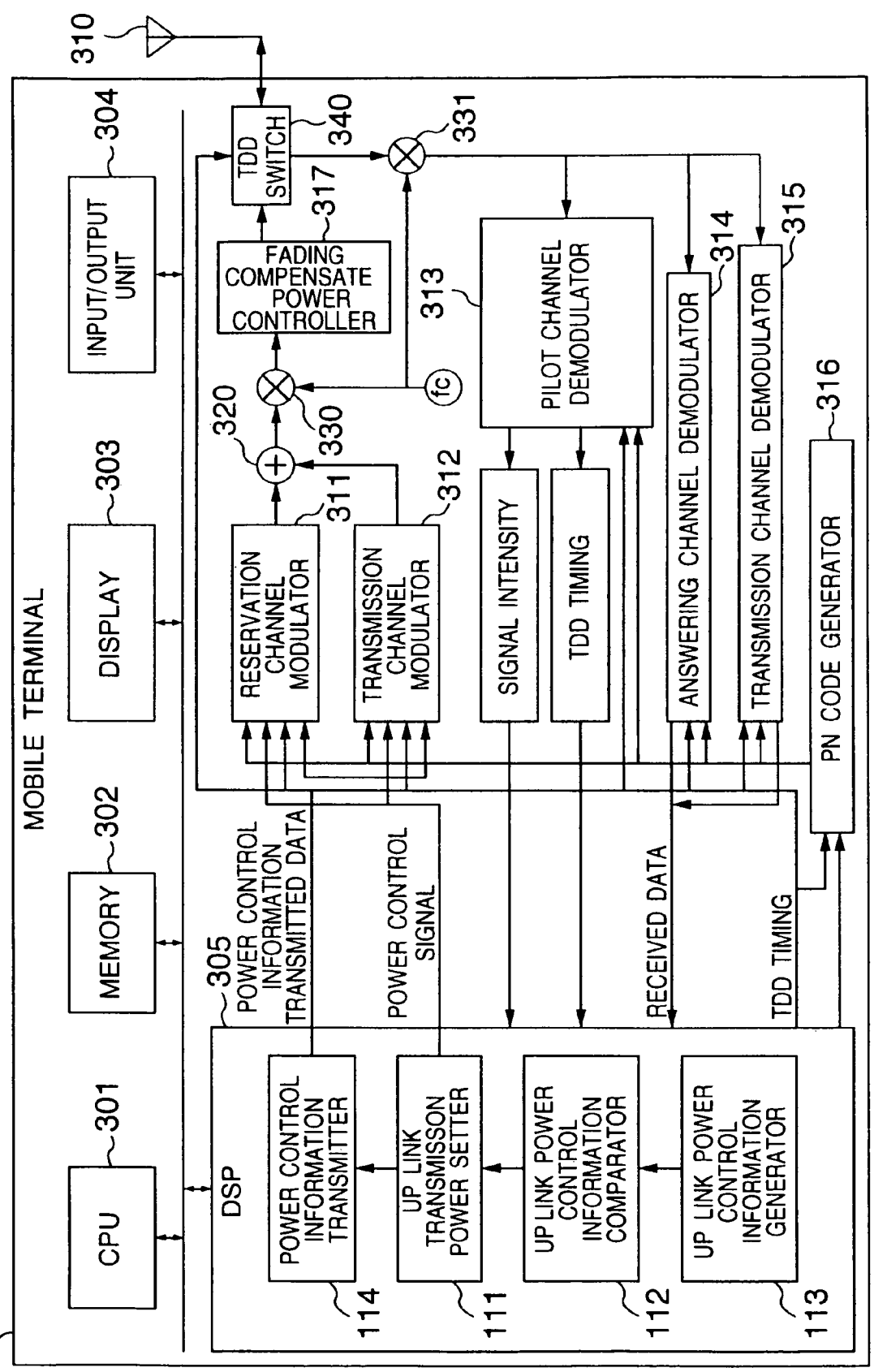
FIG. 3 is a block diagram of a mobile terminal 110 of the mobile communication system according to this embodiment.

FIG. 3 shows in block diagram an outline of the construction of the mobile terminal 110 of the mobile communication system according to this embodiment. Referring to FIG. 3, the mobile terminal 110 further has a CPU 301, a memory 302, a display unit 303, an input/output unit 304, the DSP 305, an antenna 310, a reservation channel modulator 311, a transmission channel modulator 312, a Pilot channel demodulator 313, an answering channel demodulator 314, a transmission channel demodulator 315, a PN code generator 316, a fading-compensating power controller 317, an adder 320, multipliers 330 and 331, and a TDD switch 340.

In the mobile terminal 110, as illustrated in FIG. 3, the CPU 301 that controls the operation of the whole terminal is connected to the memory 302 that loads a control program, the display unit 303 that displays the condition of the operation, the input/output unit 304 that makes the input/output process on the data to transmit or have received, and the DSP 305 that controls the process for communicating with the base station 100.

The DSP 305 of the mobile terminal 110 includes the up link transmission power setter 111, the up link power control information comparator 112, the up link power control information generator 113 and the power control information transmitter 114 as described above.

The DSP 305 is connected via a bus to the reservation channel modulator 311, transmission channel modulator 312, pilot channel demodulator 313, answering channel demodulator 314, transmission channel demodulator 315, PN code generator 316, fading-compensating power controller 317, and TDD switch 340.

The reservation channel modulator 311 modulates the reservation channel through which a notice of reservation for a transmission channel is sent to the base station 100, informing the base station of having data packets to be transmitted through the transmission channel. The transmission channel modulator 312 modulates a plurality of transmission channels on which data packets are transmitted.

The reservation packets and data packets, which have been modulated by the reservation channel modulator 311 and transmission channel modulator 312, respectively, are supplied through the adder 320, multiplier 330, fading-compensating power controller 317 and TDD switch 340 to the antenna 310, from which those packets are transmitted from the antenna to the base station 100.

The pilot channel demodulator 313 demodulates the pilot channel on which a pilot signal is transmitted. The signal intensity and TDD timing of the received and demodulated pilot signal are supplied to the DSP 305.

The answering channel demodulator 314 demodulates the answering channel on which answering packets are transmitted. The transmission channel demodulator 315 demodulates a plurality of transmission channels on which data packets are transmitted.

The PN code generator 316 generates a plurality of PN codes to be used on each of the pilot channel, reservation channel, answering channel and transmission channel.

The fading-compensating power controller 317 controls the transmission power on the basis of the fading information produced from the DSP 305.

The TDD switch 340 responds to a TDD timing signal produced from the DSP 305 to timely switch the up link 121 and down link 122, or to timely change over from transmission to reception or vice versa.

Figure 4:
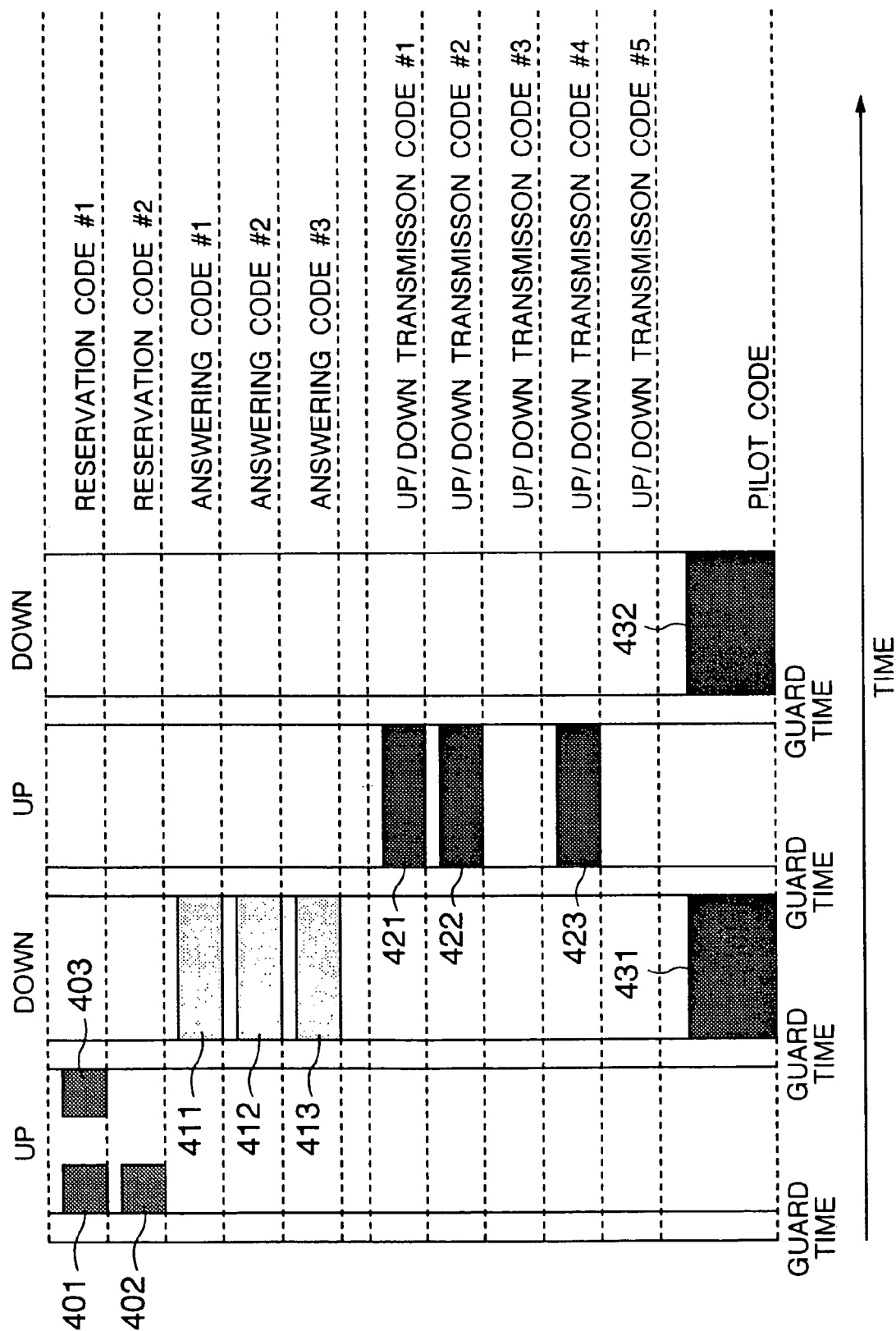
FIG. 4 is a timing chart briefly showing the data transmission in the mobile communication system according to this embodiment.

FIG. 4 is a timing chart schematically showing the data transmission in the mobile communication system according to this embodiment. Referring to FIG. 4, reference numerals 401-403 represent the reservation packets, 411-413 the answering packets, 421-423 the data packets, and 431 and 432 the pilot data.

As illustrated in FIG. 4, the data that are transmitted and received in the mobile communication system contain the reservation packets 401-403, answering packets 411-413, data packets 421-423, and pilot data 431 and 432.

That is, when the reservation packets 401-403 are transmitted from the mobile terminal 110 to the base station 100, the base station 100 sends the answering packets 411-413 to the mobile terminal 110, and then the mobile terminal 110 transmits the data packets 421-423 to the base station 100.

The reservation packets 401-403, answering packets 411-413, data packets 421-423 and pilot data 431 and 432 transmitted and received in the mobile communication system according to this embodiment are spread in their spectra in the form of the reservation code, answering code, up/down transmission code and pilot code, respectively, and transmitted on both up link 121 and down link 122 of the same carrier frequency 124.

The channels using the carrier frequency 124 are separated as up link 121 and down link 122 in a time sharing manner. Before the mobile terminal 110 transmits data packets 421-423 to the base station, the reservation packets 401-403 are first transmitted on the up link 121 from the mobile terminal 110 to the base station 100.

The base station 100 that received the reservation packets 401-403 determines a transmission channel to be assigned to the mobile terminal 110, and then transmits the answering packets 411-413 on the down link 122 to the mobile terminal 110.

The mobile terminal 110 that received the answering packets 411-413 transmits the data packets 421-423 to the base station 100.

The pilot signal to be transmitted from the base station 100 to the mobile terminal 110 is transmitted only on the down link 122 as the pilot data 431 and 432 are assigned thereto.

Figure 5:
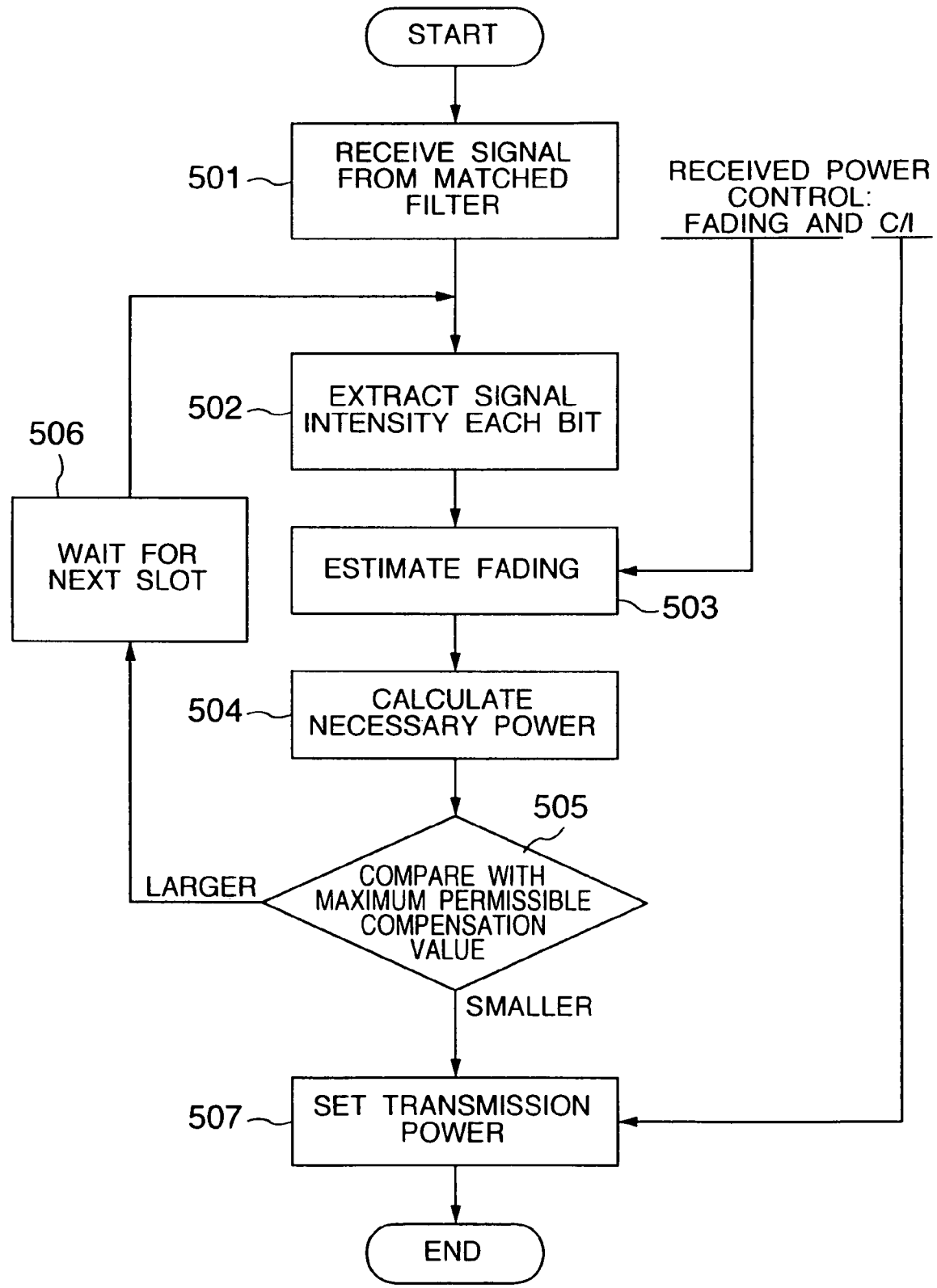
FIG. 5 is a flowchart showing procedures of the transmission power control by the base station 100 of the mobile communication system according to this embodiment.

FIG. 5 shows the procedure of the process for the transmission power control in the base station 100 of the mobile communication system according to this embodiment.

As illustrated in FIG. 5, the base station 100 makes transmission power control so that the transmission power on the down link 122 is determined on the basis of the power control information sent from the mobile terminal 110 and the signal intensity on the up link 121, and transmitted to the mobile terminal 110.

In the base station 100, at step 501, the signal on the reservation channel or transmission channel is received from the reservation channel matched filters 214-215 or transmission channel matched filters 216-217.

At step 502, the down link power control information generator 103 of the DSP 205 of the base station 100 extracts the intensity from the input signal on the reservation channel or transmission channel at each bit.

At step 503, the down link power control information generator 103 of the base station 100 estimates the fading of the up link 121 by using the power control information of the mobile terminal 110 received by the power control information receiver 104 and the previously received signal intensity at each bit on the reservation channel or transmission channel.

In other words, since the signal on the up link 121 is already compensated for by the mobile terminal 110, the received signal intensity on the reservation channel or transmission channel of the up link 121 is restored to the previous signal intensity before the compensation by the mobile terminal 110 by use of the information on the fading within the power control information transmitted from the mobile terminal 110, and then the fading on the up link 121 is estimated.

At step 504, the down link power control information generator 103 of the base station 100 computes the transmission power necessary for compensating for the fading that has been estimated at step 503.

At step 505, the down link power control information comparator 102 of the base station 100 compares the necessary power computed by the down link power control information generator 103 and the maximum permissible compensation value of the transmission power which can be compensated for by the base station 100.

At step 505, if the transmission power necessary for compensating for the fading estimated at step 503 is larger than the maximum permissible compensation value of the base station 100 as a result of the comparison between the necessary power computed by the down link power control information generator 103 and the maximum permissible compensation value of the base station 100, the program goes to step 506.

At step 506, the base station 100 stops until the following slot, and then the program goes back to the step 502.

At step 505, if the transmission power necessary for compensating for the fading estimated at step 503 is equal to or lower than the maximum permissible compensation value of the base station 100 as a result of the comparison between the necessary power calculated by the down link power control information generator 103 and the maximum permissible compensation value of the base station 100, the program goes to step 507.

At step 507, the down link transmission power setter 101 of the base station 100 fixes the transmission power on the down link 122 according to the necessary power calculated by the down link power control information generator 103.

Figure 6:
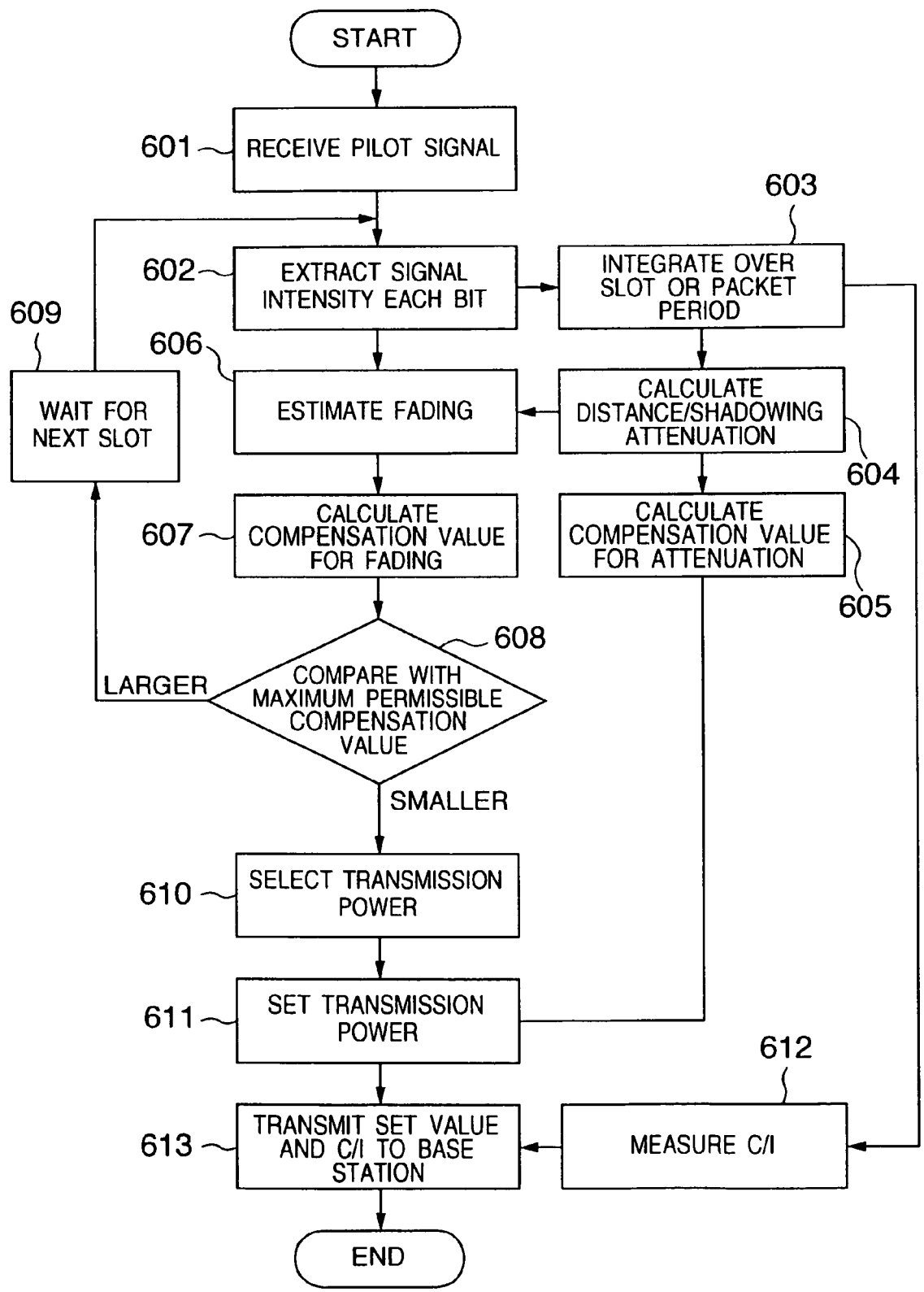
FIG. 6 is a flowchart showing procedures of the transmission power control by the mobile terminal 110 of the mobile communication system according to this embodiment.

FIG. 6 shows the procedure of the process for the transmission power control in the mobile terminal 110 of the mobile communication system according to this embodiment.

As illustrated in FIG. 6, the mobile terminal 110 makes transmission power control so as to set the transmission power on the up link 121 by receiving the pilot signal sent from the base station 100, and to transmit to the base station 100 the power control information used to control the transmission power.

In the mobile terminal 110, at step 601, the pilot signal transmitted from the base station 100 is received by the pilot channel demodulator 313 and fed to the DSP 305.

At step 602, the up link power control information generator 113 of the mobile terminal 110 extracts the signal intensity from the received pilot signal.

At step 603, the up link power control information generator 113 of the mobile terminal 110 integrates the extracted signal intensity over the particular time slot period in which the received pilot signal is transmitted or over the particular packet period in which the packet is sent.

At step 604, the up link power control information generator 113 of the mobile terminal 110 computes the attenuation of the pilot signal due to the distance or the shadowing attenuation of the pilot signal due to obstacles along the channel from the integrated value over the slot or packet period.

At step 605, the up link power control information generator 113 of the mobile terminal 110 computes the compensation value for use in the compensation for the attenuation calculated at step 604.

At step 606, the up link power control information generator 113 of the mobile terminal 110 estimates he fading caused in the pilot signal from the signal intensity at each bit of the pilot signal extracted at step 602.

At step 607, the up link power control information generator 113 of the mobile terminal 110 calculates the compensation value for use in compensating for the fading estimated at step 606.

At step 608, the up link power control information comparator 112 of the mobile terminal 110 compares the transmission power necessary to compensate for the fading calculated by the up link power control information generator 113, and the maximum permissible compensation value of the maximum transmission power which can be compensated for by the mobile terminal 110.

At step 608, if the transmission power necessary to compensate for the fading estimated at step 607 is larger than the maximum permissible compensation value of the mobile terminal 100 as a result of the comparison between the necessary power calculated by the up link power control information generator 113 and the maximum permissible compensation value of the mobile terminal 110, the program goes to step 609.

At step 609, the mobile terminal 110 stops until the following slot, and then the program goes back to step 602.

At step 608, if the transmission power necessary to correct the fading estimated at step 607 is equal to or smaller than the maximum permissible compensation value of the mobile terminal 100 as a result of the comparison between the necessary power calculated by the up link power control information generator 113 and the maximum permissible compensation value of the mobile terminal 110, the program goes to step 610.

At step 610, the up link transmission power setter 111 of the mobile terminal 110 selects a transmission power level nearest to the necessary power calculated by the up link power control information generator 113 from a plurality of previously set transmission power levels.

At step 611, the up link transmission power setter 111 of the mobile terminal 110 sets the transmission power on the up link 121 in accordance with the compensation value for use in compensating for the distance or shadowing attenuation which was calculated at step 605 and the transmission power level selected at step 610.

At step 612, the up link power control information generator 113 of the mobile terminal 110 measures the ratio C/I from the integrated value obtained when the pilot signal was integrated over the slot or packet period at step 603.

At step 613, the power control information transmitter 114 of the mobile terminal 110 sends the information of fading set at step 611 and the ratio C/I obtained at step 612 as power control information to the base station 100.

Another embodiment of the mobile communication system using FDD to which the invention is applied will be described with reference to FIGS. 7 to 9.

Figure 7:
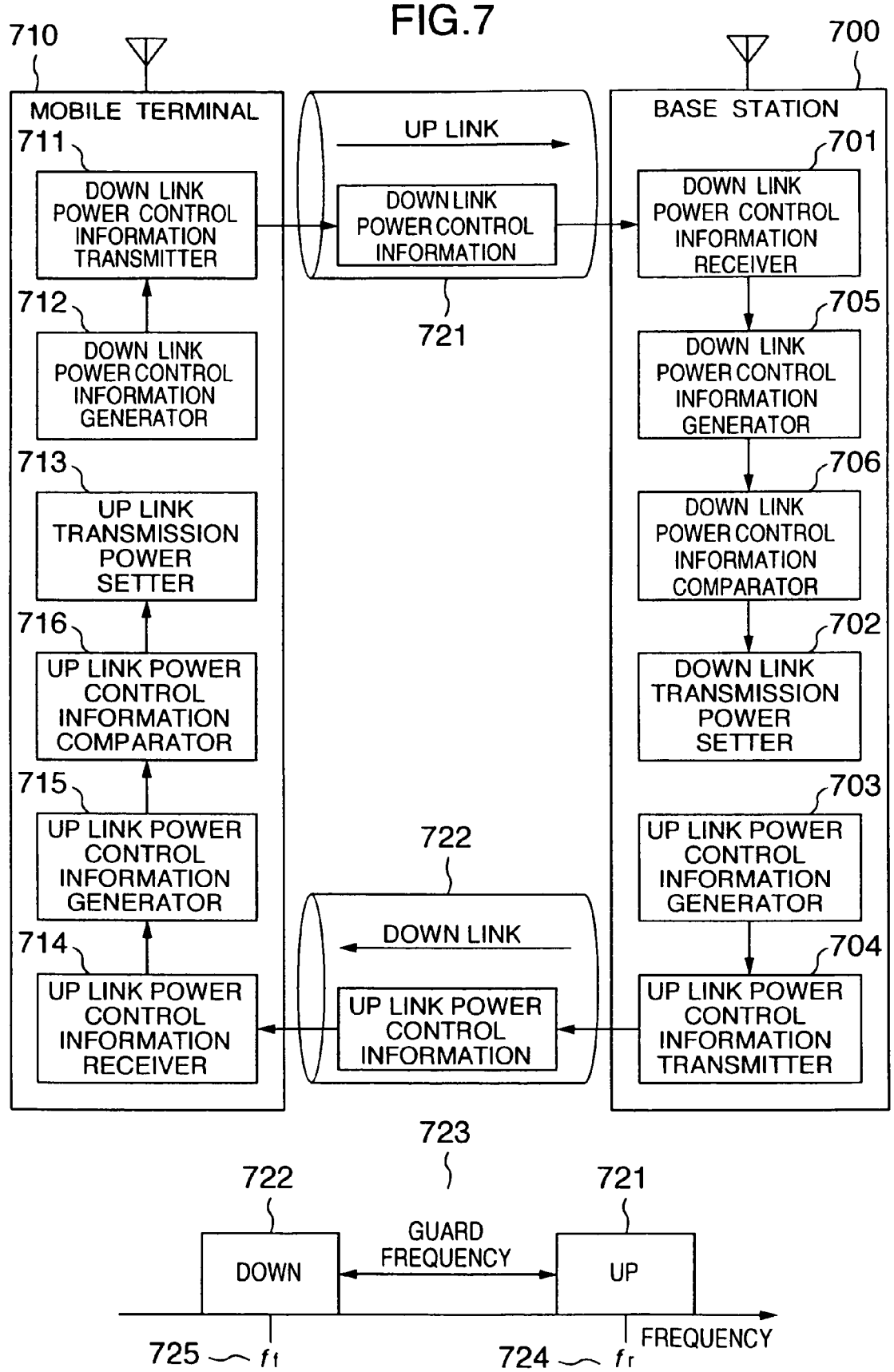
FIG. 7 is a block diagram of a mobile communication system according to another embodiment of the invention.

Referring to FIG. 7, the FDD mobile communication system includes a base station 700 which has a down link power control information receiver 701, a down link transmission power setter 702, an up link power control information generator 703 and an up link power control information transmitter 704, a mobile terminal 710 which has a down link power control information transmitter 711, a down link power control information generator 712, an up link transmission power setter 713 and an up link power control information receiver 714, an up link 721, a down link 722, a guard frequency 723, an up link carrier frequency 724, and a down link carrier frequency 725.

In this system, the base station 700 and the mobile terminal 710 are connected by the up link 721 for transmitting a signal from the mobile terminal 710 to the base station 700, and the down link 722 for transmitting a signal from the base station 700 to the mobile terminal 710. The up link 721 and down link 722 utilize different carrier frequencies, or the up link carrier frequency 724 and the down link carrier frequency 725, respectively, with the guard frequency band 723 provided between the channels in order to prevent the interference.

When the base station 700 sends a pilot signal on the down link 722, the mobile terminal 710 receives he pilot signal, and causes the down link power control information generator 712 to measure the intensity of the received pilot signal on the down link and to thereby estimate the attenuation of the signal and fading condition in the transmission path. Thus, it generates down link power control information for use in controlling the transmission power in the down link 722.

The down link power control information transmitter 711 of the mobile terminal 710 transmits the generated down link power control information through the up link 721 to the base station 700.

The down link power control information receiver 701 of the base station 700 receives the down link power control information sent from the mobile terminal 710, and supplies it to the down link transmission power setter 702. The down link transmission power setter 702 of the base station 700 sets the transmission power of the down link 722 by using the received down link power control information.

The up link power control information generator 703 of the base station 700, when receiving the signal on the up link 721 from the mobile terminal 710, measures the condition of fading or the like of the signal on the up link 721, and generates up link power control information for use in controlling the transmission power of the up link 721. The power control information transmitter 704 of the base station 700 transmits the generated up link power control information through the down link 722 to the mobile terminal 710.

The up link power control information receiver 714 of the mobile terminal 710 receives the up link power control information sent from the base station 700, and supplies it to the up link transmission power setter 713. The up link transmission power setter 713 sets the transmission power of the up link 721 by using the received up link power control information.

Figure 8:
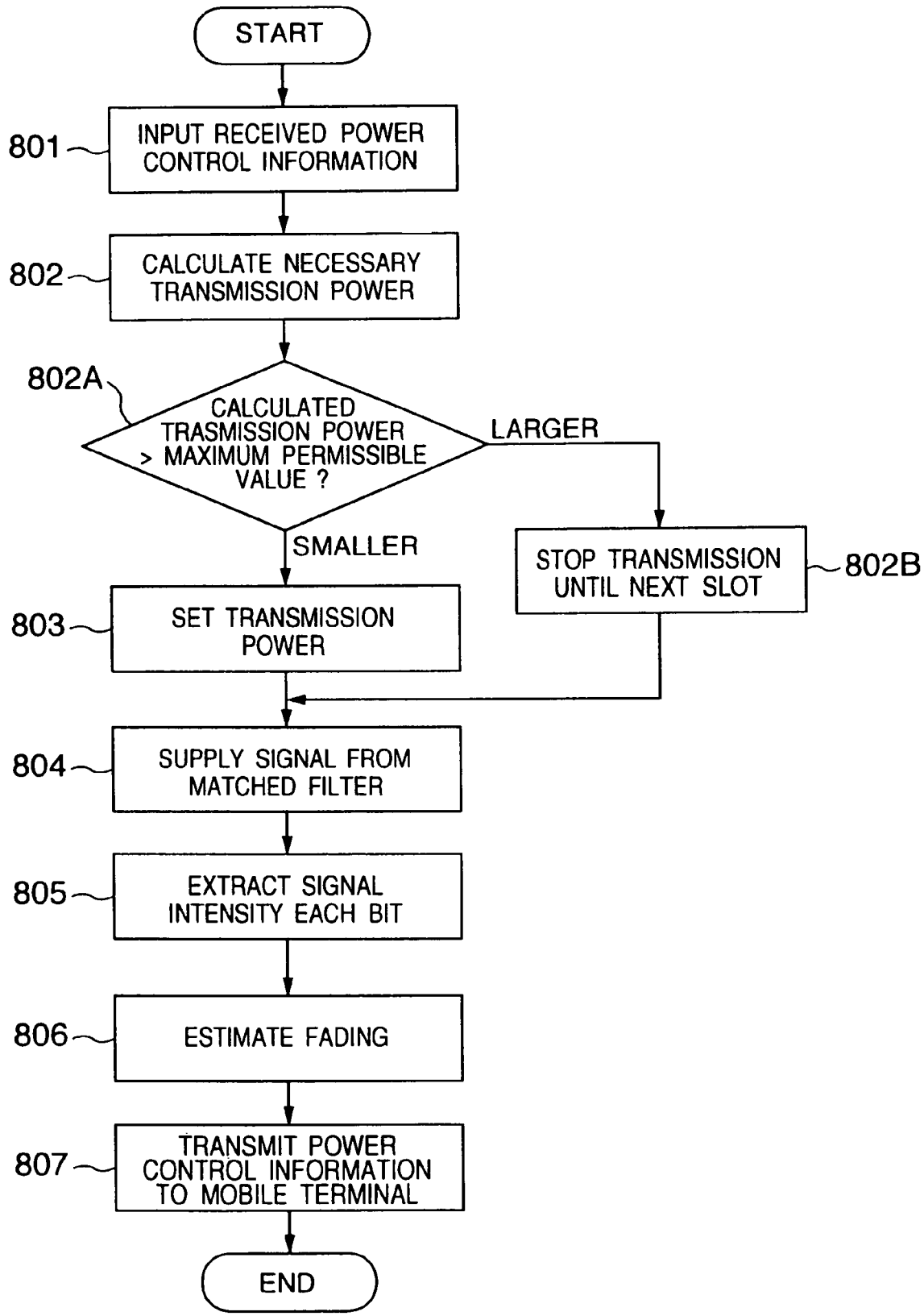
FIG. 8 is a flowchart showing procedures of the transmission power control by a base station 700 of a mobile communication system according to the above other embodiment.

FIG. 8 shows the procedure of the process for the transmission power control in the base station 700 of the mobile communication system.

As illustrated in FIG. 8, the base station 700 makes transmission power control so that the transmission power of the down link 722 is set according to the down link power control information sent from the mobile terminal 710, and that the condition of the fading or the like on the up link 721 is measured, thus producing up link power control information, which is transmitted to the mobile terminal 710.

At step 801, the down link power control information receiver 701 of the base station 700 receives the down link power control information sent from the mobile-terminal 710 through the up link 721.

At step 802, the down link transmission power setter 702 of the base station 700 calculates the necessary transmission power by using the down link power control information sent from the mobile terminal 710. At step 802A, the down link power control information comparator 706 of the base station 700 compares the transmission power necessary for use in compensating for the necessary power that is generated by the down link power control information generator 705, and the maximum permissible compensation value of the maximum transmission power that can be compensated for in the base station 700.

At step 802A, if the necessary transmission power calculated on the basis of the down link power control information is larger than the maximum permissible compensation value of the base station 700 as a result of the comparison, the program goes to step 802B for stopping the transmission. After the transmission is stopped until the next slot or packet period, the program goes to step 804, where the signal from the matched filter is received. On the other hand, if the calculated necessary transmission power is equal to or smaller than the maximum permissible compensation value of the base station 700, the program goes to step 803, where the transmission power is set.

At step 803, the down link transmission power setter 702 of the base station 700 sets the transmission power of the down link 722 by using the calculated necessary transmission power.

At step 804, the up link power control information generator 703 of the base station 700 receives the signal sent on the up link 721 from the mobile terminal 710.

At step 805, the up link power control information generator 703 of the base station 700 extracts the signal intensity at each bit from the received signal on the up link 721.

At step 806, the up link power control information generator 703 of the base station 700 estimates the fading of the signal sent on the up link 721 from the mobile terminal 710 on the basis of the change of the signal intensity extracted at each bit, and generates up link power control information.

At step 807, the up link power control information transmitter 704 of the base station 700 transmits the up link power control information, which the up link power control information generator 703 has generated, through the down link 722 to the mobile terminal 710.

Figure 9:
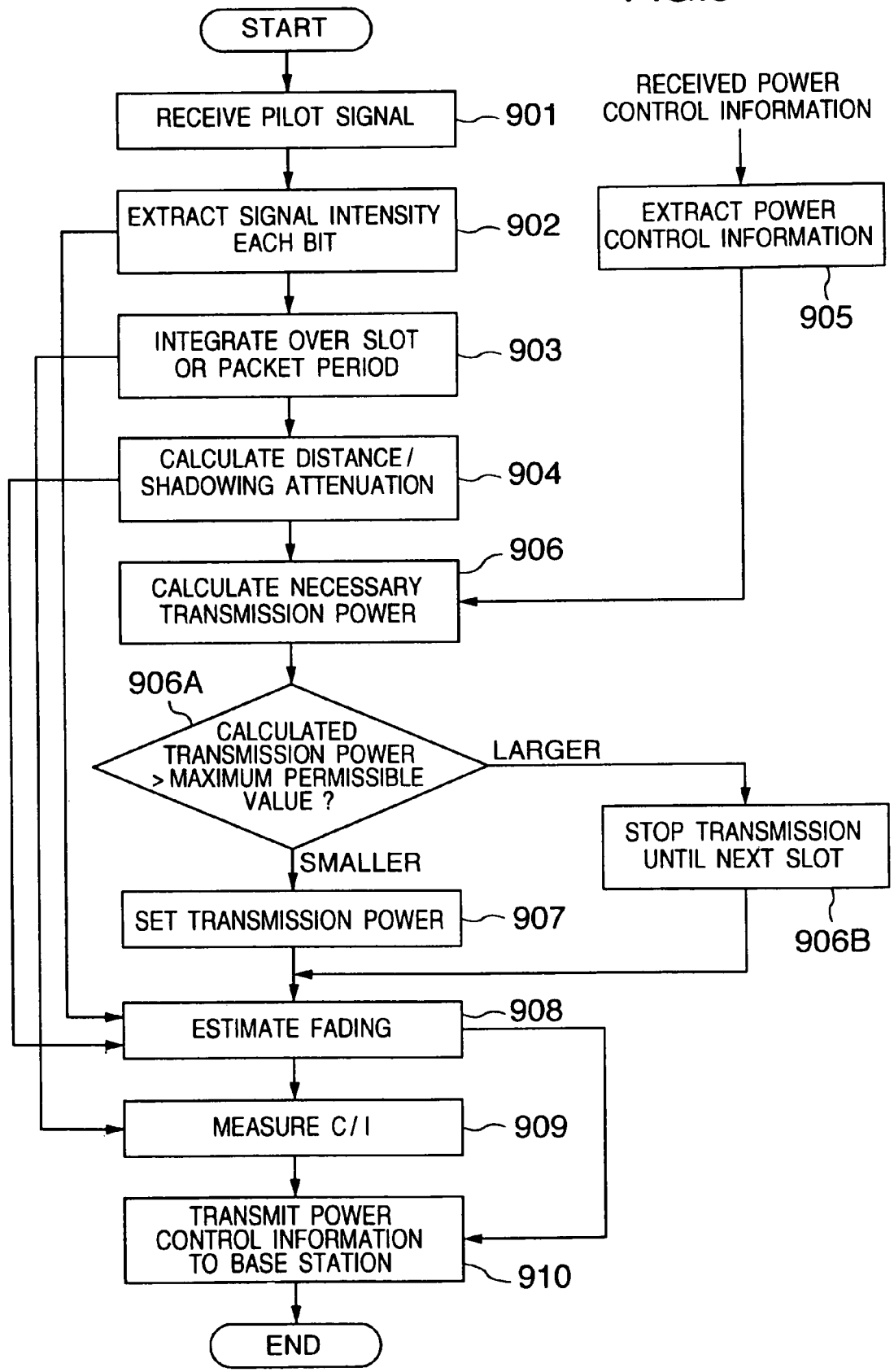
FIG. 9 is a flowchart showing procedures of the transmission power control by a mobile terminal 710 of a mobile communication system according to the above other embodiment.

FIG. 9 shows the procedure of the process for the transmission power control in the mobile terminal 710 of the mobile communication system according to this latter embodiment.

As illustrated in FIG. 9, the mobile terminal 710 makes transmission power control so that the transmission power of the up link 721 is set according to the up link power control information sent from the base station 700, and that the condition of the fading or the like of the signal on the down link 722 is measured, thus generating down link power control information, which is sent to the base station 700.

At step 901, the mobile terminal 710 receives the pilot signal sent on the down link 722 from the base station 700. At step 902, the up link transmission power setter 713 of the mobile terminal 710 extracts the signal intensity at each bit from the received pilot signal.

At step 903, the up link transmission power setter 713 of the mobile terminal 710 integrates the extracted signal intensity over a particular time, namely, a time slot for which data is transmitted, or a packet period for which a packet is transmitted.

At step 904, the up link transmission power setter 713 of the mobile terminal 710 calculates the attenuation of the pilot signal due to the distance or the shadowing attenuation due to the obstacles along the transmission path on the basis of the integrated value over the slot or packet period.

At step 905, the up link power control information receiver 714 of the mobile terminal 710 extracts information of the attenuation due to the distance or shadowing from the received up link power control information.

At step 906, the up link transmission setter 713 of the mobile terminal 710 computes a necessary transmission power of the signal to be sent on the up link 721 on the basis of the attenuation of the pilot signal due to the distance or the attenuation of the pilot signal due to the obstacles which has been calculated at step 904, and the information of the attenuation due to the distance or shadowing which has been extracted at step 905. At step 906A, the up link power control information comparator 716 of the mobile terminal 710 compares the transmission power calculated for compensation by the up link power control information generator with the maximum permissible compensation value of the maximum transmission power that can be compensated for in the mobile terminal 710. At step 906A, if the transmission power calculates at step 906 and necessary to compensate for the attenuation which is the result of the steps 904, 905 is larger than the maximum permissible compensation value of the mobile terminal 710 when the necessary power calculated by the up link power control information generator 715 is compared with the maximum permissible compensation value of the mobile terminal 710, the program goes to step 906B. At step 906B, the mobile terminal 710 stops until the next slot or packet period, and then the program goes to step 908, where the fading is estimated.

At step 906A, if the necessary power calculated by the up link power control information generator is equal to or smaller than the maximum permissible compensation value of the mobile terminal 710, the program goes to step 907, where the transmission power is set.

At step 907, the up link transmission power setter 713 of the mobile terminal 710 sets the above-calculated transmission power of the up link 721.

At step 908, the down link power control information generator 712 of the mobile terminal 710 estimates the fading in the down link 722 by using the signal intensity extracted at each bit from the pilot signal at step 902, and the distance or shadowing attenuation calculated at step 904.

At step 909, the down link power controls information generator 712 of the mobile terminal 710 measures the ratio C/I (Carrier/Interference) from the integrated value that was attained by integration over the slot or packet period of the pilot signal at step 903.

At step 910, the down link power control information transmitter 711 of the mobile terminal 710 transmits the information of fading estimated at step 908 and the ratio C/I obtained at step 909 as the down link power control information on the up link 721.

According to the mobile communication system using FDD, as describe above, the power control information of the up link 721 which has been obtained in the base station 700 is transmitted to the mobile terminal 710 in order for the mobile terminal 710 to control the transmission power of the up link 721, and the power control information of the down link 722 which has been attained in the mobile terminal 710 is transmitted to the base station 700 in order for the base station 700 to control the transmission power of the down link 722.

The maximum permissible compensation value in the above comparing process can be dynamically set in accordance with the condition of the communication path, for example, the velocity of the mobile terminal. The maximum permissible compensation value further can be set in accordance with the difference between the data rates of the communication packets or the service quality needed. Each of the above procedures for the transmission power control can be implemented by a processing software configuration using programs associated with the control procedure.

While the present invention has been specifically described on the basis of the above embodiments, the invention is not limited to the above embodiments, but of course, various changes and compensations can be made on the invention without departing from the scope of the invention.

What is claimed is:

1. A mobile terminal which communicates with a base station by radio, comprising:
   an antenna for receiving signals from said base station and transmitting signals to said base station; and
   a processor for judging whether or not to transmit data to said base station based on a condition of a channel between said mobile terminal and said base station,
   wherein, if said processor judges not to transmit said data, said transmission of the data is temporarily stopped.

2. A mobile terminal according to claim 1, wherein, if said processor judges not to transmit said data, said transmission of the data is stopped for at least a slot period.

3. A mobile terminal according to claim 2, wherein said condition of a channel includes a signal intensity of a signal received via the channel between said mobile terminal and said base station.

4. A mobile terminal according to claim 1, wherein said condition of a channel includes a signal intensity of a signal received via the channel between said mobile terminal and said base station.

* * * * *